No. 739,956. PATENTED SEPT. 29, 1903.
J. WALDEN.
SHOE.
APPLICATION FILED APR. 4, 1903.
NO MODEL.
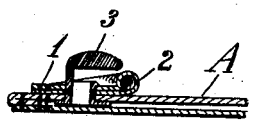
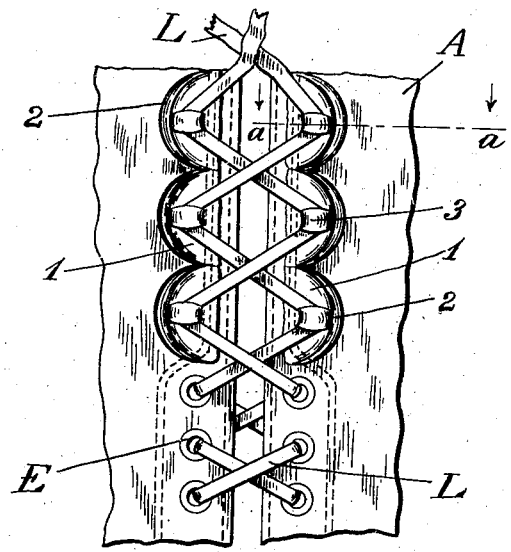
Witnesses
Inventor No. 739,956. Patented September 29, 1903.

UNITED STATES PATENT OFFICE.

JOSEPH WALDEN, OF ORANGE, NEW JERSEY.

SHOE.

SPECIFICATION forming part of Letters Patent No. 739,956, dated September 29, 1903.

Application filed April 4, 1903. Serial No. 151,023. (No model.)

*To all whom it may concern:*

Be it known that I, JOSEPH WALDEN, a citizen of the United States, residing at Orange, in the county of Essex and State of New Jersey, have invented a new and useful Improvement in Shoes, of which the following is a specification, reference being had to the accompanying drawings.

My invention relates to the lacing of shoes, and especially of women's shoes.

In the accompanying drawings, Figure 1 is a front view of the upper portion of a shoe with lacing in position, and Fig. 2 is a cross-section on the line *a a* of Fig. 1.

The first element in my device is the shield 1, which is preferably of leather and semicircular in shape and has a molded and embossed edge 2. (Shown in Figs. 1 and 2.) The straight edge of the shield 1 is stitched to the front edge of the lacing portion of the shoe-upper. The shank of an ordinary lacing-hook 3 is then inserted in the usual manner, passing through the shield 1 and attaching it to the shoe-upper A. This completes the construction. The number of shields attached will vary according to the height of the shoe. From the eyelets E the lace L is then laced through the hooks 3 in the ordinary manner.

What I claim, and desire to secure by Letters Patent, is—

The combination with a shoe-upper of a series of separate shields each of which is attached to the upper by stitching along its front edge and by a lacing-hook inserted through each shield, the rear edge being unstitched and folded and embossed so as to guard the lacing-hook entrance, substantially as shown and described.

JOSEPH WALDEN.

Witnesses:
 WM. S. BEAMAN,
 GEORGE J. GROB.